US005914886A

United States Patent [19]

Lee

[11] Patent Number: 5,914,886

[45] Date of Patent: Jun. 22, 1999

[54] GOODS SELECTING APPARATUS AND METHOD FOR AUTOMATIC VENDING MACHINE

[75] Inventor: Hee-Soo Lee, Kwangju, Rep. of Korea

[73] Assignee: Kwangju Electronics Co., Ltd., Kwangju-city, Rep. of Korea

[21] Appl. No.: 08/888,904

[22] Filed: Jul. 7, 1997

[30] Foreign Application Priority Data

Jul. 11, 1996 [KR] Rep. of Korea ...................... 96-27984
Jul. 11, 1996 [KR] Rep. of Korea ...................... 96-27985

[51] Int. Cl.[6] .............................. G06F 17/00; G06F 7/00; G07F 11/00; B65G 59/00

[52] U.S. Cl. ................................ 364/479.02; 364/479.01; 364/479.03; 364/479.08; 364/479.14; 221/8; 221/129

[58] Field of Search ......................... 364/479.01, 479.02, 364/479.03, 479.08, 479.14; 194/217; 221/8, 129

[56] References Cited

U.S. PATENT DOCUMENTS

| | | | |
|---|---|---|---|
| 4,225,056 | 9/1980 | Flubacker | 221/2 |
| 4,359,147 | 11/1982 | Levasseur | 364/479.02 |
| 4,636,963 | 1/1987 | Nakajima et al. | 364/479.08 |
| 4,690,263 | 9/1987 | Yokomori | 194/317 |
| 4,962,866 | 10/1990 | Phillips | 221/8 |
| 5,111,962 | 5/1992 | Oden | 221/129 |
| 5,235,519 | 8/1993 | Miura | 364/479.03 |
| 5,464,087 | 11/1995 | Bounds et al. | 364/479.01 |
| 5,472,116 | 12/1995 | Barbe et al. | 221/126 |
| 5,579,233 | 11/1996 | Burns | 364/479.1 |

*Primary Examiner*—William E. Terrell
*Assistant Examiner*—Wonki Park
*Attorney, Agent, or Firm*—Perman & Green, LLP

[57] ABSTRACT

A goods selecting apparatus and method for an automatic vending machine enables uses a control device to take necessary actions in case a user selects an article in error among goods stored in the automatic vending machine thereby preventing undesired goods from being extracted. The apparatus has a key input part for generating a key signal corresponding to a cancel or an extract selection of a goods selected by an user. A control part is provided and selectively generates a control signal to cancel or to send the selected goods to a goods extracting slot according to a key signal from the key input part within a predetermined time.

2 Claims, 8 Drawing Sheets

GOODS SELECTING APPARATUS AND METHOD FOR AUTOMATIC VENDING MACHINE

BACKGROUND OF THE INVENTION

1. Field of the Invention

This invention relates, in general, to an automatic vending machine, and more particularly to a goods selecting apparatus and method for an automatic vending machine which enables control means to take necessary actions in case an user selects an article in error among goods stored in the automatic vending machine thereby preventing undesired goods from being extracted from the vending machine.

2. Description of the Prior Art

Generally, automatic vending machines have been widely used in countries. The automatic vending machine keeping various goods therein such as coffee, cigarette, cake, and candy have a goods safekeeping chamber and determines what kind of goods can be vended by an amount or sum of coins inserted by an user.

FIG. 1 is a perspective view of a typical automatic vending machine. As shown in the drawing, the typical automatic vending machine includes a housing 10 for forming an external appearance thereof, and a door 20 which combined through a hinge and a front one surface of the housing 10 to close or open the housing 10. The door 20 is formed at the outside thereof with a door grip 30 for closing or opening the door, a coin insert slot 40 in which coins can be inserted for purchasing goods, a goods selecting part 2 having a plurality of selecting keys for selecting a goods being desired by an user, a display part 4 for displaying a selling possibility state of goods and the amount of the coins being inserted by the user, a goods extracting part 15 for extracting the selected goods, and a coin return part 70 for returning the change after having been extracted goods.

In these automatic vending machines, when coins are inserted into the automatic vending machine and a selecting button to select a goods is pushed by the user, the goods is extracted through the goods extract part of the automatic vending machine.

As shown in FIG. 2, the goods selecting apparatus of the conventional automatic vending machine includes a coin detecting mechanism 1 for providing a detected signal according to a state of inserted coins and the amount of the coins to be inserted to the automatic vending machine, a goods selecting part 2 for selecting a predetermined article among goods stored or provided therein, a control part 3 for generating a control signal to display a selling possibility state of goods befitting the inserted coins and the amount of the coins according to the detected signal from the coin detecting mechanism 1 and to extract the goods selected from the goods selecting part 2, a display part 4 for displaying the total inserted amount of money and a selling possibility state of the automatic vending machine according to a display control signal from the control part 3, and a goods extracting part 5 for extracting a selected goods according to a extracting control signal output from the control part 3.

Now, a good selecting and operating process of the conventional automatic vending machine will be explained hereinafter.

When coins are inserted through a coin inserting slot(not shown), condition of the coins or the bill and the amount of coins or bill are detected by a plurality of sensors(not shown) of the coin detecting mechanism 1 and a signal detected therefrom is provided to the control part 3. The control part 3 generates a control signal for displaying the total amount of the inserted coins according to the detected signal from the coin detecting mechanism 1 and outputs to the display part 4. The display part 4 displays a selling possibility state according to the control signal from the control part 3 in case the total inserted amount of inserted coins exceeds the price of the goods stored in the automatic vending machine.

After the selling possibility state of the goods shown in the display part 4 has confirmed, a selecting button is pushed by the user to cause the selected goods to be extracted from the automatic vending machine.

A button signal corresponding to the goods selected from the goods selecting part 2 is provided to the control part 3. At this time, the control signal for extracting the selected goods is generated from the control part 3.

Accordingly, the user can any time obtain his own desired article among the goods stored in the automatic vending machine through the goods extracting part 5, according to the control signal output from the control part 3.

In the control part 3, the coins inserted into the coin detecting mechanism 1 and the selling price of goods are compared to determine whether they match each other and if change is available, a control signal is generated to return the change. That is, the change is delivered to a coin delivery part(not shown) by a return signal generated from the control part 3. Thus, the user receives the change from the vending machine.

Subsequently, the control part 3 compares a selling price and a selected goods in view of the inserted coins, and checks if there is needed to return any change. If there is needed to return some change, the control part 3 generates a control signal to return the change to the coin detecting mechanism after having checked the presence of the change. The change from the coin detecting mechanism 1 is returned to the coin return part 70 according to the control signal from the control part 3.

However, there is a problem in the above automatic vending machine in that, when the user uses the vending machine, and if the user mistakenly pushes the button corresponding to a goods he does not want, the user should obtain undesired goods, since it is impossible to cancel the push of button.

SUMMARY OF THE INVENTION

It is, therefore, an object of the invention to provide a goods selecting apparatus and method for an automatic vending machine which enables control means to take necessary actions in case an user selects, in error, article among goods stored in the automatic vending machine thereby preventing undesired goods from being extracted from the vending machine.

In order to accomplish the above object, there is provided a goods selecting apparatus for an automatic vending machine comprising:

a key input part for generating a key signal corresponding to cancel or extract of a goods selected by an user; and a control part for selectively generating a control signal to cancel or extract the selected goods into a goods extracting slot according to a key signal from the key input part within a predetermined time.

In accordance with another object of the present invention, there is provided a goods selecting method for an automatic vending machine, the method comprising the steps of:

initializing with predetermined input parameters according to a control signals of a control part when an AC voltage is provided from outside to the automatic vending machine, and displaying a selling possibility state of a goods when the amount of inserted coins is above the goods selling price after having checked the total inserted amount of coins when the coins are inserted into the automatic vending mechanism;

judging whether an extracting operation of a goods should be cancelled or performed according to a key signal from a key input part after having been selected the goods through the goods selecting part; and extracting the selected goods into a goods extracting slot when the key signal from the key input part is the select confirming signal, and canceling the extracting operation of the selected goods when the key signal from the key input part is the canceling signal.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE PREFERRED EMBODIMENT

The invention will now be described in detail with reference to the accompanying drawings.

Figure 1:
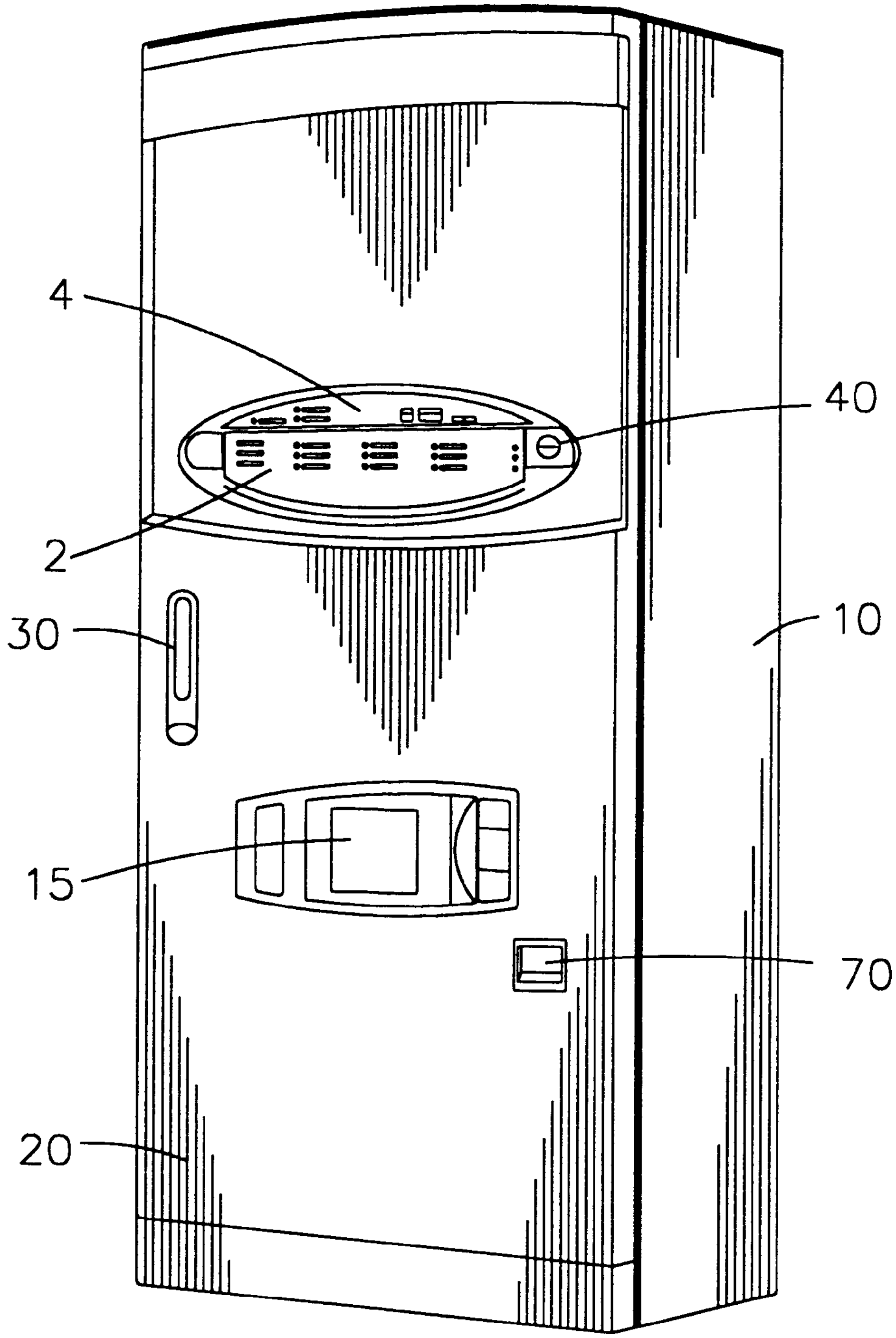
FIG. 1 (PRIOR ART)
FIG. 1 is a perspective view of a typical automatic vending machine.
Figure 2:
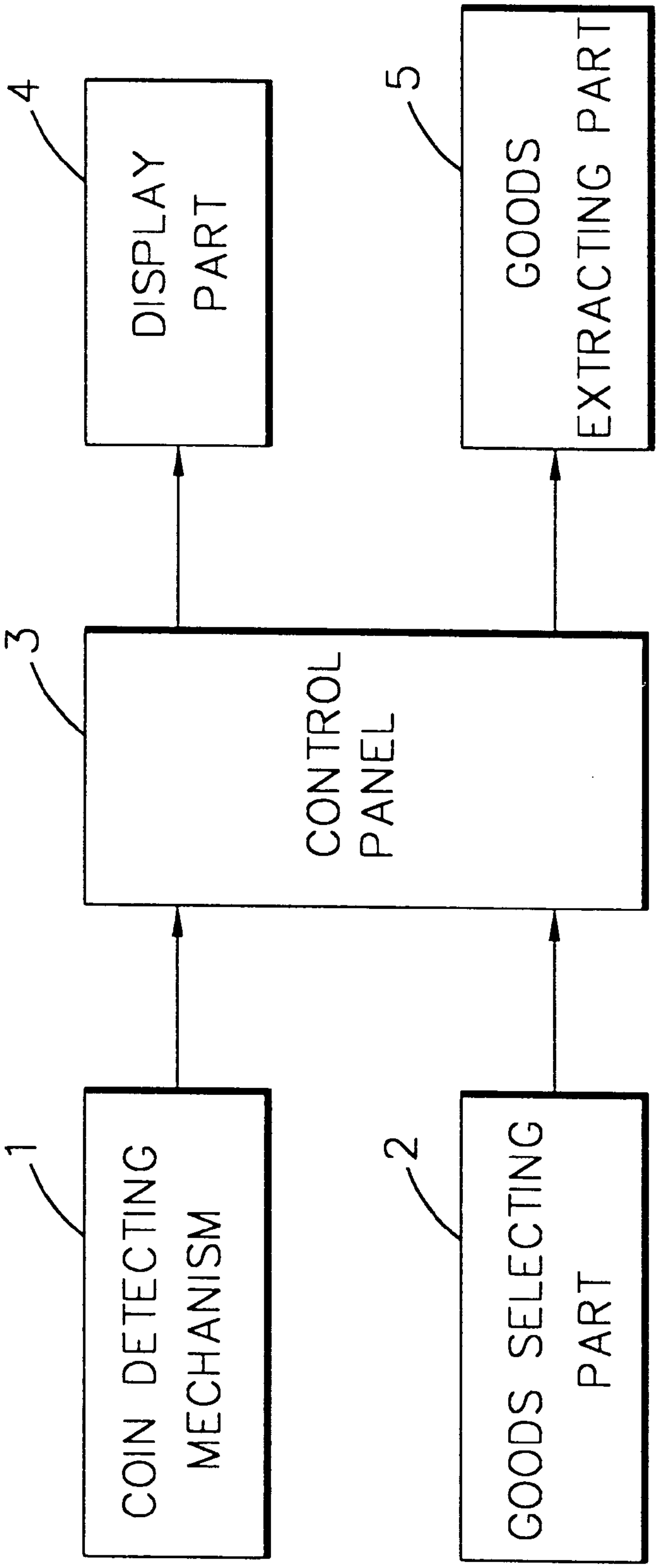
FIG. 2 is a schematic block diagram of the typical automatic vending machine.
Figure 3:
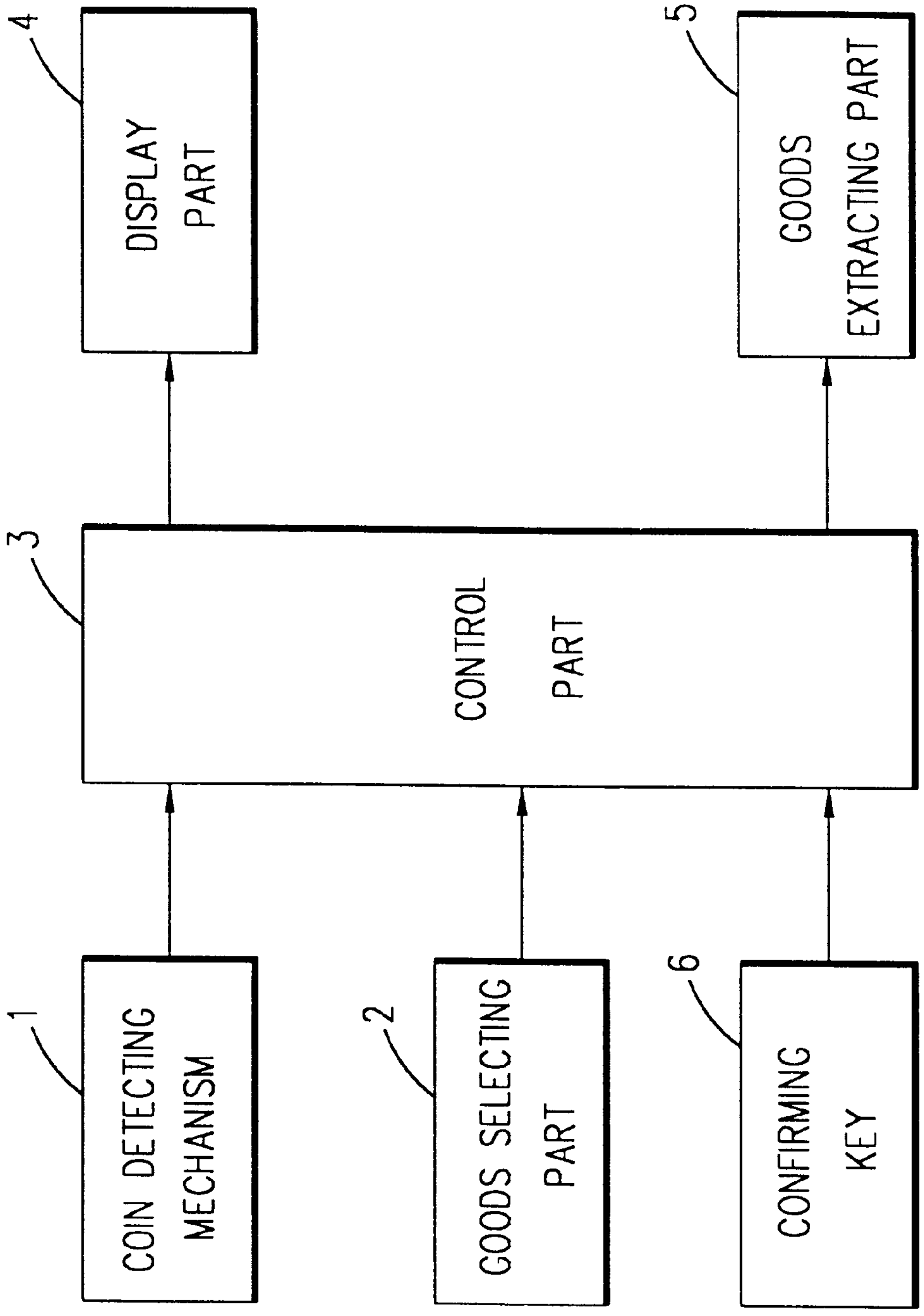
FIG. 3 is a schematic block diagram of a goods selecting apparatus for automatic vending machine according to a first embodiment of the present invention.

Referring to FIG. 3, there is shown a goods selecting apparatus for an automatic vending machine according to the present invention comprising a coin detecting mechanism 1, a goods selecting part 2, a control part 3, a display part 4, a goods extracting part 5 and a confirming key 6.

Also, the basic elements(for example, the coin detecting mechanism 1, the goods selecting part 2, the display part 4 and the goods extracting part 5) of the invention are similarly constructed as those of the conventional automatic vending machine and description of the similar basic elements will be not described hereinafter.

Figure 4:
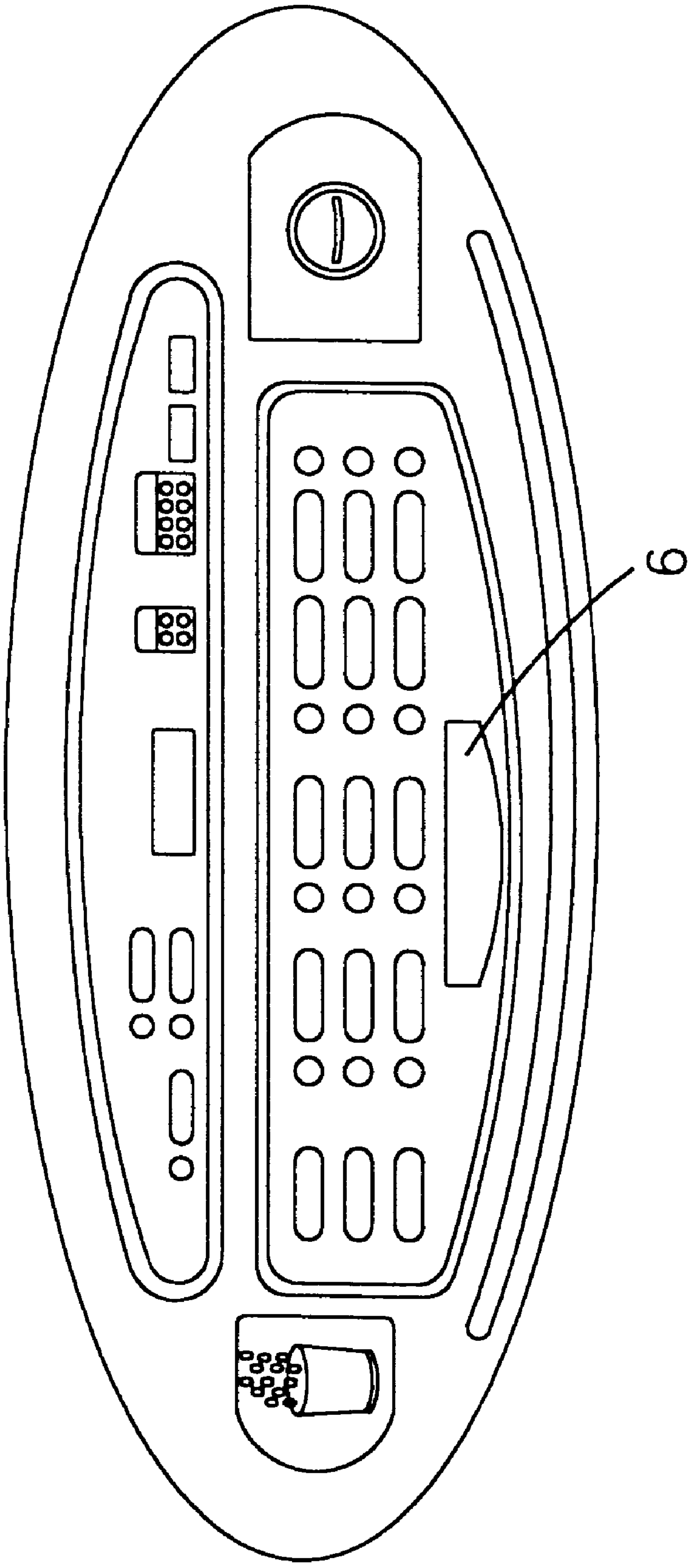
FIG. 4 is a schematic view of a front panel of the automatic vending machine having a confirming key in FIG. 3.
Figure 5:
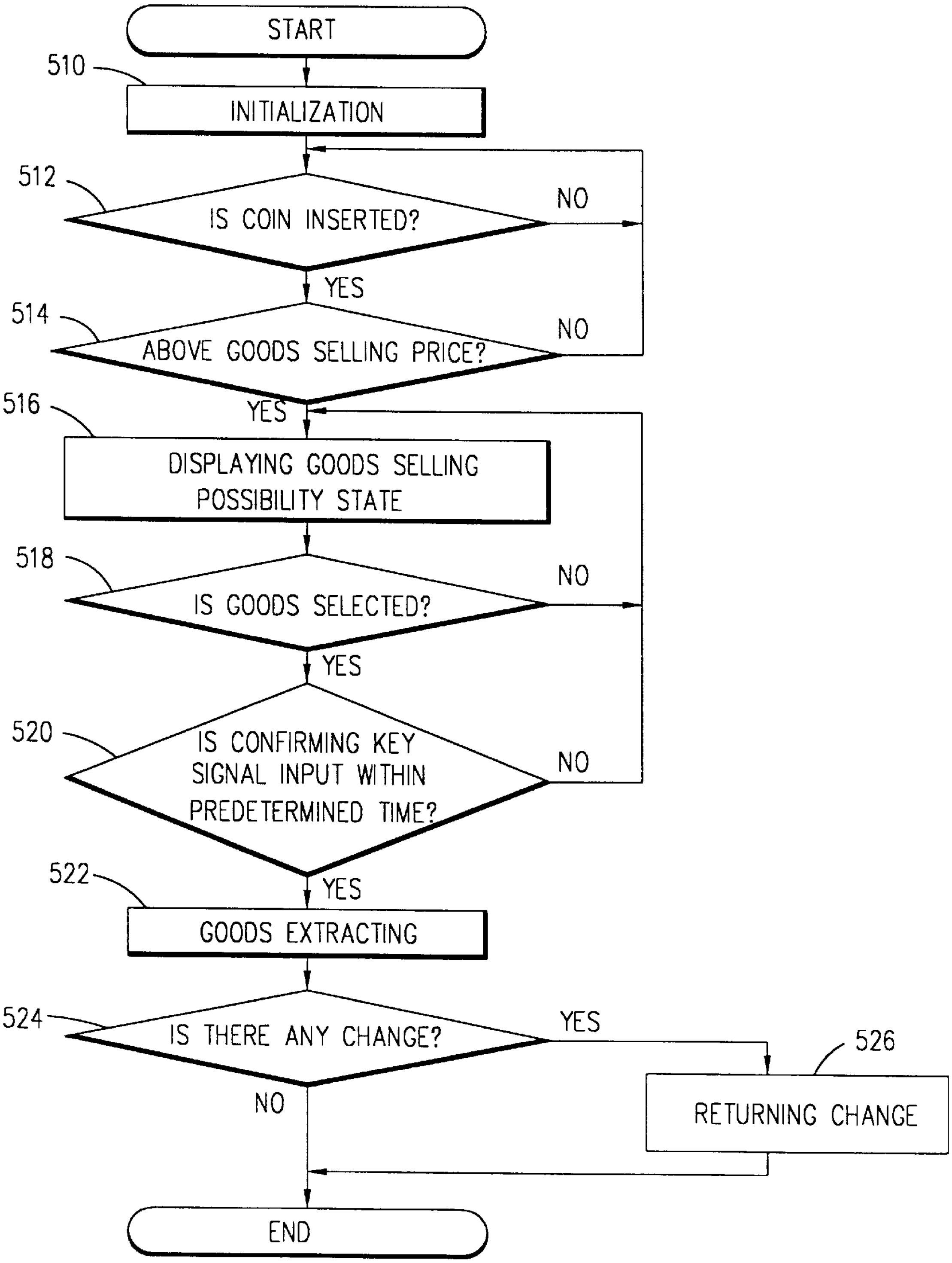
FIG. 5 is a flowchart for explaining a goods selecting process of the automatic vending machine according to the first embodiment of the present invention.

In FIG. 3, the confirming key 6 as shown in FIG. 4 is installed a predetermined position at a goods selecting part 2 so that the user confirmes a goods selected state in case of correctly selecting his own desired article among goods stored in the automatic vending machine. When the confirming key 6 is pushed by the user, the key signal thereof is provided to the control part 3. The control part 3 generates a control signal to extract the selected goods after the key signal has been input from the confirming key 6 within a predetermined time, for example 3 seconds.

Now, the goods selecting apparatus and method for the automatic vending machine of the present invention will be described with reference to FIGS. 2 to 5.

In the present invention, the goods selecting apparatus for the automatic vending machine remains the same in the overall shape thereof as in the typical automatic vending machine. Those elements of the goods selecting apparatus for the automatic vending machine common to both the present invention and the prior art and will thus carry the same reference numerals so that no further explanation is deemed necessary.

As shown in FIG. 3, when an AC voltage is provided from outside to a power part(not shown), the automatic vending machine starts to be initialized with predetermined input parameters according to a control signal of the control part 3 at step 510.

When coins are inserted through the coin insert slots by the user at step 512, the coins are guided to the coin detecting mechanism 1 by the guide means. The coin detecting mechanism 1 provides a detected signal to the control part 3 to determine the state of inserted coins and simultaneously the amount of total inserted coins.

After having determined the state of inserted coins, the control part 3 determines whether the amount of inserted coins is above the price of goods selected by the user at step 514. If the amount of inserted coins is above the price of goods, the control part 3 generates a control signal to display the selling possibility state of goods(for example, a light corresponding to the goods selected by the user is maintained "on" state), and outputs to the display part 4. Accordingly, the display part 4 displays the selling possibility state of goods at step 516.

Subsequently, the control part 3 determines whether a good(s) has been selected by the user through the goods selecting part 2 at step 518. As the result of determination, it is determined at step 518 that the good(s) has been selected, the procedure flows to step 520.

At step 520, the control part 3 determines whether a key signal from the confirming key 6 is input within 3 seconds.

As a result of the determination at step 520, if the confirming key signal has not been input from the confirming key 6 within 3 seconds, the control part 3 generates a control signal to cancel the selected goods thereby preventing the goods from being extracted and procedure returns to step 516, 518 and 520 to repeatedly execute operation thereof.

Meanwhile, as the result of the determination at step 520, if the confirming key signal has been input from the confirming key 6 within 3 seconds, the control part 3 generates a control signal to extract the selected goods through the goods selecting part 2. The selected goods is extracted through the extracting slot 15 according to the control signal from the control part 3 at step 522.

At this time, the control part 3 compares the price of selected goods with the amount of inserted money at step 524 to determine if there is needed to return any change. If there is needed to return a change, the control part 3 generates a control signal to return the change to the user. Therefore, the change is returned to the coin return slot 70 through the coin detecting mechanism 1 according to the control signal from the control part 3 at step 526.

When the user mistakenly pushes the goods selecting button of the goods selecting part 2, the control part 3 determines whether a confirming signal has been input from the goods selecting part 2. If the confirming key signal has not been input from the goods selecting part 2 to the control part 3 within 3 seconds, an operation for extracting the selected goods are automatically canceled thereby preventing undesired goods from being extracted from the vending machine.

Figure 6:
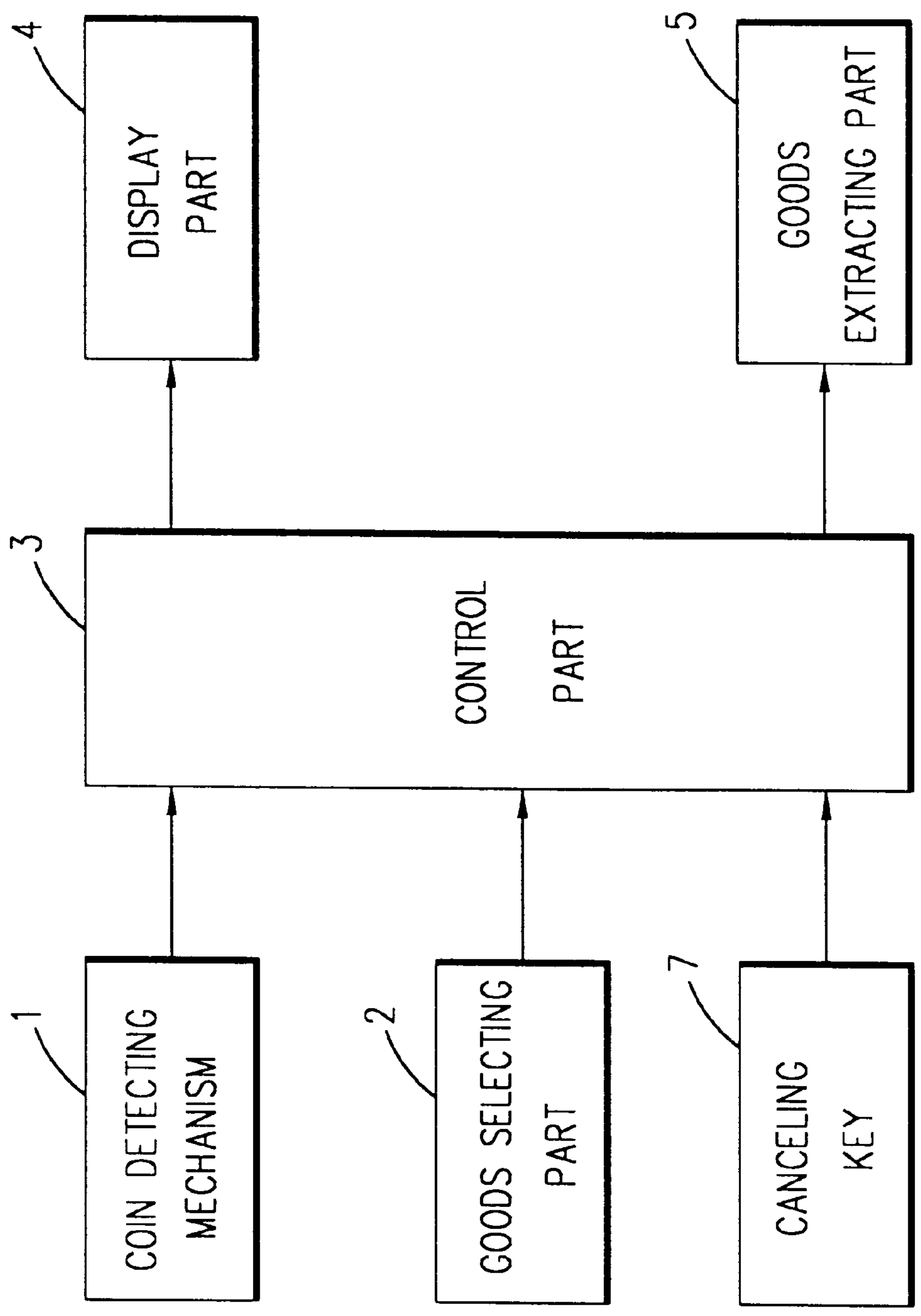
FIG. 6 is a schematic block diagram of a goods selecting apparatus for automatic vending machine according to a second embodiment of the present invention.

FIG. 6 is a block diagram of a goods selecting apparatus for an automatic vending machine according to the invention. The apparatus comprises a coin detecting mechanism 1, a goods selecting part 2, a control part 3, a display part 4, a goods extracting part 5 and a canceling key 7.

Also, the basic elements(for example, the coin detecting mechanism 1, the goods selecting part 2, the display part 4 and the goods extracting part 5) of the invention are similarly constructed as those of the conventional automatic vending machine and description of the similar basic elements will be not described hereinafter.

In FIG. 6, the canceling key 7 is installed at a predetermined position of the goods selecting part 2 so that the user can cancel his erroneous action when he pushes a key button in error or pushes a key button corresponding to undesired goods. When the canceling key 7 is pushed by the user, the key signal thereof is provided to the control part 3. The control part 3 generates a control signal to cancel the extracting operation of the goods after a key signal has been input from the canceling key 7 within 3 seconds.

Figure 7:
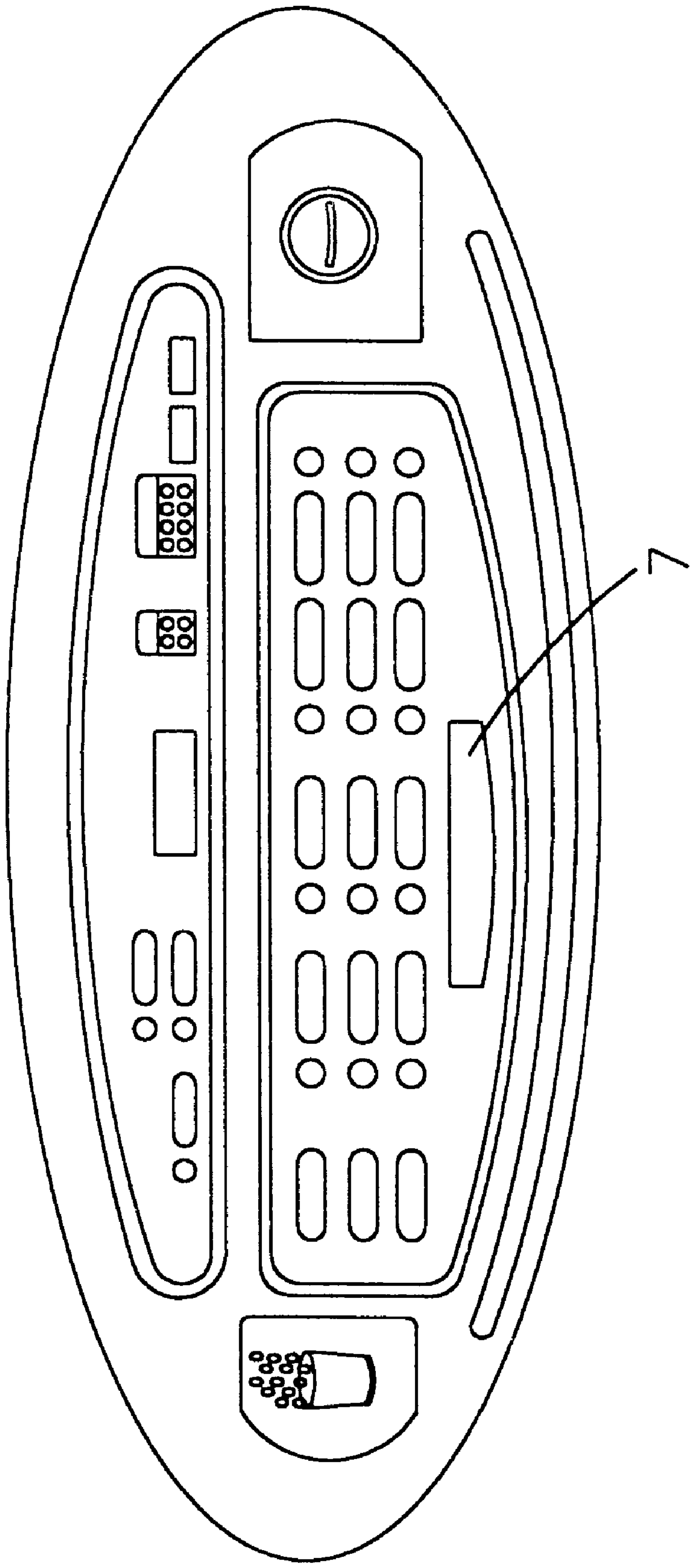
FIG. 7 is a schematic view of a front panel of the automatic vending machine having a canceling key in FIG. 6.
Figure 8:
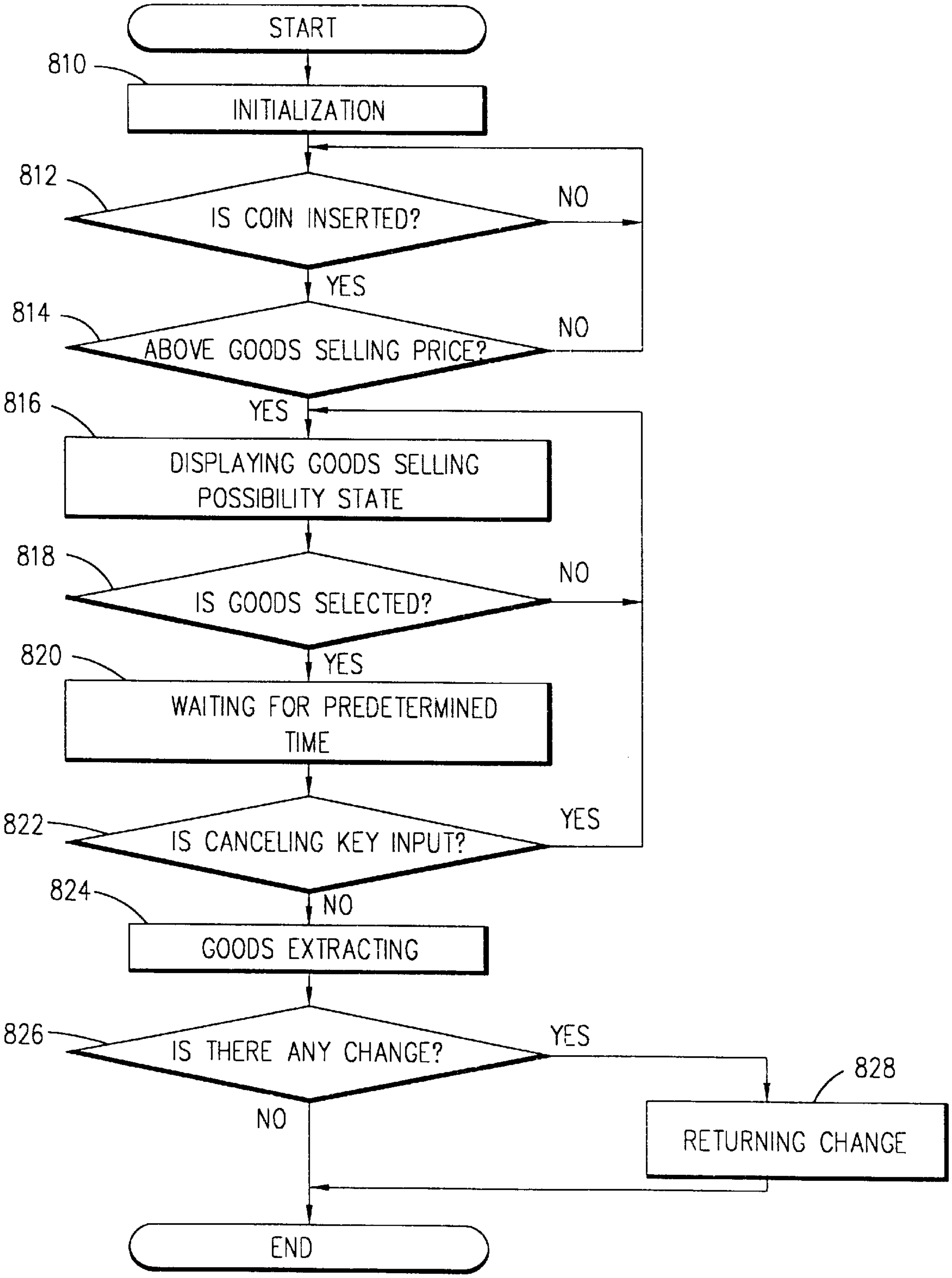
FIG. 8 is a flowchart for explaining a goods selecting process of the automatic vending machine according to the second embodiment of the present invention.

Now, the goods selecting apparatus and method for the automatic vending machine of the present invention will be described with the reference to FIGS. 6 to 8.

When an AC voltage is provided from the outside to a power part(not shown), the automatic vending machine starts to be initialized with predetermined input parameters according to a control signal of the control part 3 at step 810.

When coins are inserted through the coin insert slot by the user at step 812, the coins are guided to the coin detecting mechanism 1 by the guide means. The coin detecting mechanism 1 provides a detected signal to the control part 3 to determine the state of inserted coins and simultaneously the amount of total inserted coins.

After having determined the state of inserted coins, the control part 3 determines whether the amount of inserted coins is above the price of goods selected by the user at step 814. If the amount of inserted coins is above the price of goods, the control part 3 generates a control signal to display the selling possibility state of goods(for example, a light corresponding to the goods selected by the user is maintained "on" state), and outputs to the display to part 4. Accordingly, the display part 4 displays the selling possibility state of goods at step 816.

Subsequently, the control part 3 determines whether a good(s) has been selected by the user through the goods selecting part 2 at step 818. As the result of determination, it is determined at step 818 that the goods has been selected the procedure flows to step 820. At step 820, the control part 3 determines whether a key signal from the canceling key 7 is input within 3 seconds.

As a result of the determination at steps 820 and 822, if the canceling key signal has been input from the canceling key 7 within 3 seconds, the control part 3 generates a control signal to cancel the extracting operation of the goods thereby preventing the goods from being extracted and procedure returns to steps 818, 820 and 822 to repeatedly execute operation thereof.

Meanwhile, as the result of the determination at steps 820 and 822, if the canceling key signal has not been input from the canceling key 7 within 3 seconds, the control part 3 generates a control signal to extract the selected goods through the goods selecting part 2. The selected goods are extracted through the goods extracting slot 15 according to the control signal from the control part 3 at step 824.

At this time, the control part 3 compares the price of selected goods with the amount of inserted money at step 826 to determine if there is needed to return any change. If there is needed to return a change, the control part 3 generates a control signal to return the change to the user. Therefore, the change is returned to the coin return slot 70 through the coin detecting mechanism 1 according to the control signal from the control part 3 at step 828.

When the user mistakenly pushes the goods selecting button of the goods selecting part 2, the control part 3 determines whether a confirming key signal has been input from the goods selecting part 2. If the confirming key signal has not been input from the goods selecting part 2 to the control part 3 within 3 seconds, an operation for extracting the selected goods are automatically canceled thereby preventing undesired goods from being extracted from the vending machine.

As described above, the present invention has an advantage in which control means can take necessary actions in case an user selects an article in error article among goods stored in the automatic vending machine thereby preventing undesired goods from being extracted from the vending machine.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A goods selecting apparatus for an automatic vending machine comprising:

control means, including a cancel key input part for generating a key signal corresponding to a control signal to cancel a selection decision made by a user of the vending machine, and a confirm key input part for generating a key signal corresponding to a control signal to confirm an extract decision made by the user of the vending machine;

initialization means for the vending machine according to predetermined input parameters according to signals generated by the control part when an AC voltage is provided from outside to the vending machine;

goods selection means for the user to select goods to be purchased from the vending machine;

coin detecting means to check the total amount of coins inserted into the vending machine by the user against the amount of goods selected;

displaying means to display to the user a selling state of the goods selected corresponding to the amount of coins inserted into the vending machine and the amount of the selected goods selling price after the coin detecting means have checked the total inserted amount of coins into the vending machine; and the control means including means for determining within a specified time interval whether the control signal is present to effect a cancellation of the selected goods or permit an extracting operation of the selected goods according to the input of the key signals from either the cancel key input part or the confirm key part after the goods have been selected through the goods selecting part.

2. A goods selecting method for an automatic vending machine comprising the steps of:

initializing with predetermined input parameters according to control signals of a control part when an AC voltage is provided from outside to the automatic vending machine, selecting by a user good(s) to be purchased, checking the total inserted amount of coins when the coins are inserted into the automatic vending machine against the amount of goods selected, and displaying a selling state of the goods selected corresponding to the amount of inserted coins and the amount of the selected goods selling price after having checked the total inserted amount of coins when the coins are inserted into the automatic vending machine;

determining within a given time interval whether a cancel signal is present to effect a cancellation of the selected goods or an extracting operation of the selected goods according to the input of a key signal from a key input part after the goods have been selected through a goods selecting part; and using the key signal from said key input part for extracting the selected goods into a goods extracting slot when the key signal from the key input part is the select confirming signal, and canceling the extracting operation of the selected goods when the key signal from the key input part is a canceling signal.

* * * * *